Oct. 20, 1931.  F. A. COARI  1,827,736
NUT PICKING MACHINE
Filed April 14, 1928  5 Sheets-Sheet 1
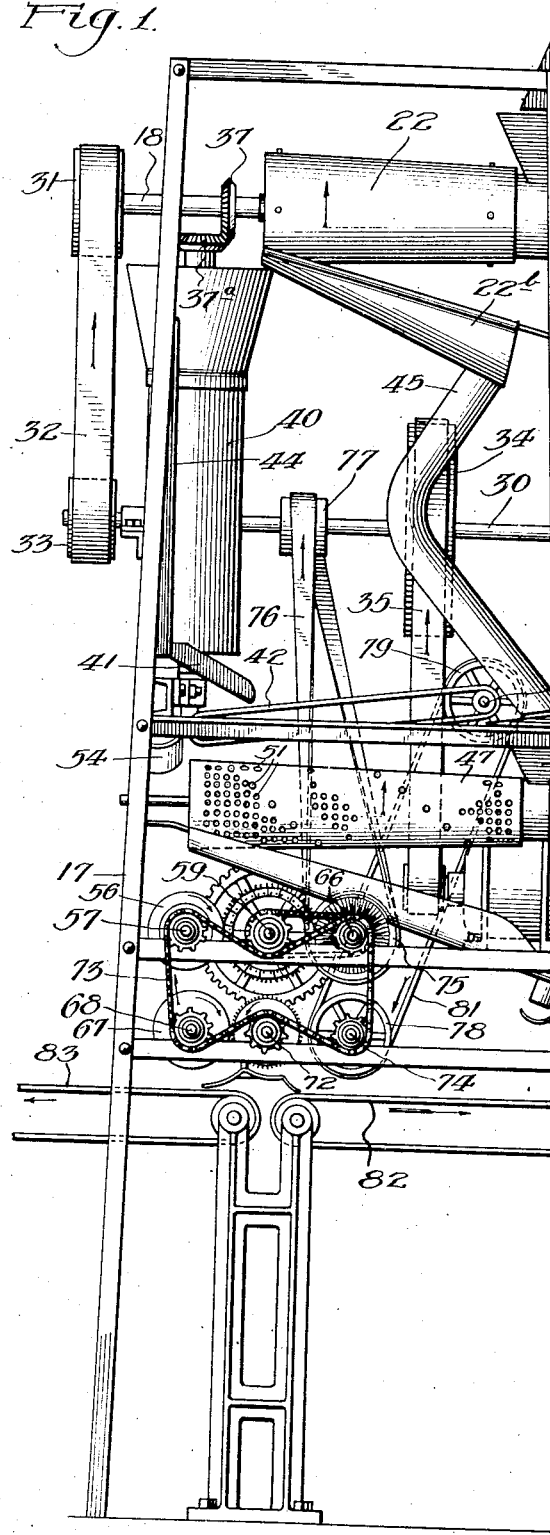
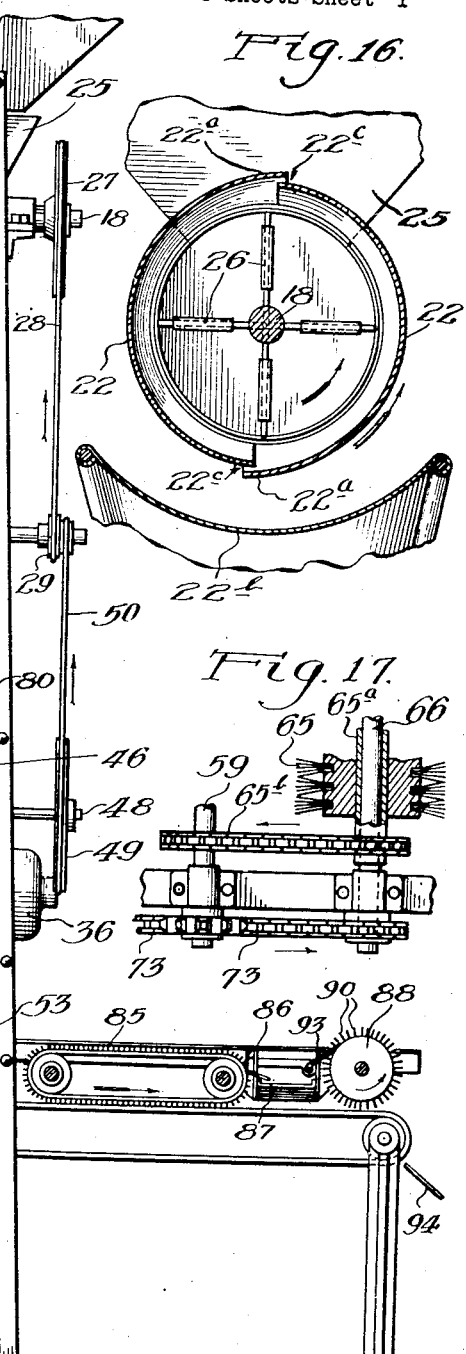
Inventor:
Frank A. Coari,
By [signature]
Attys.

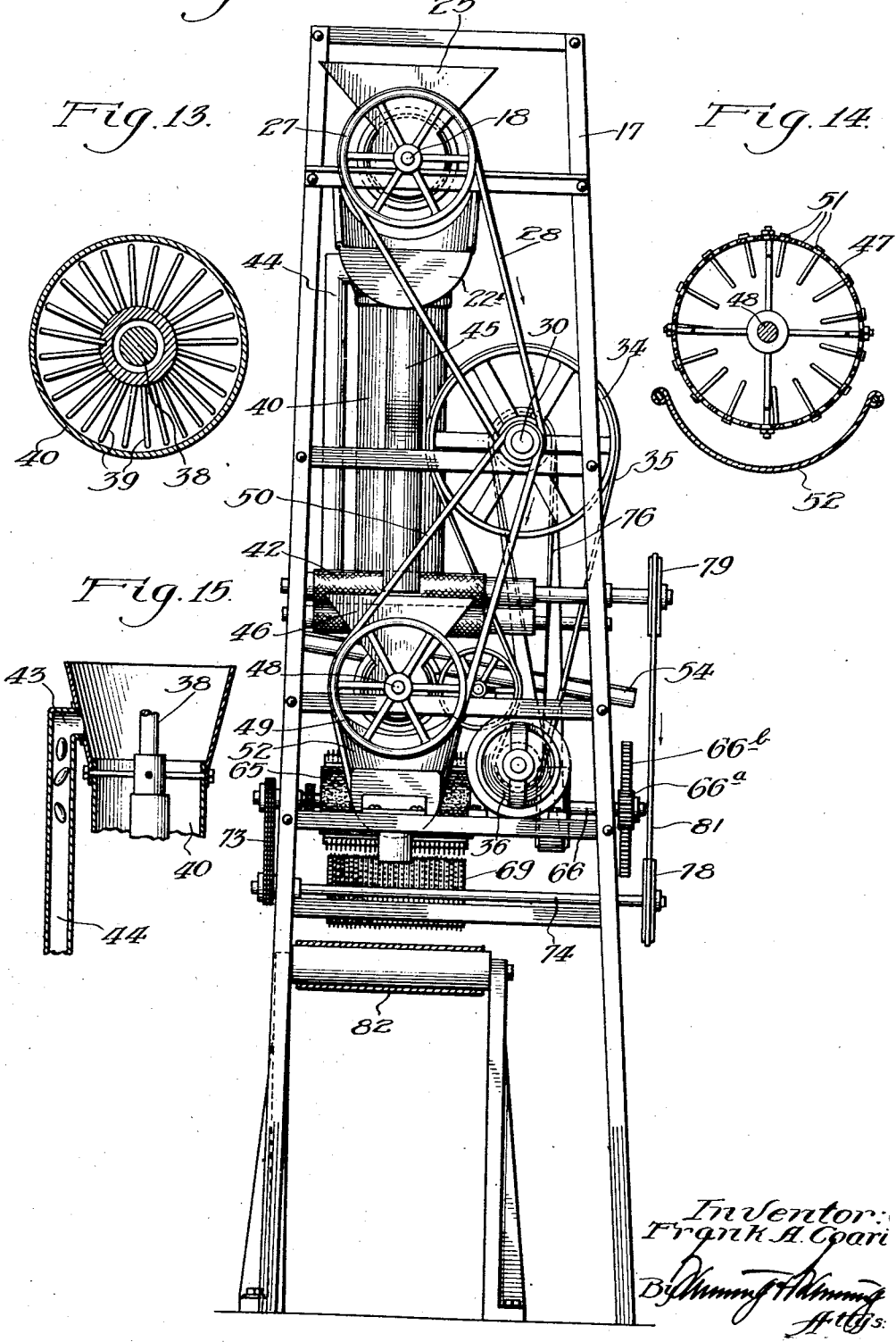

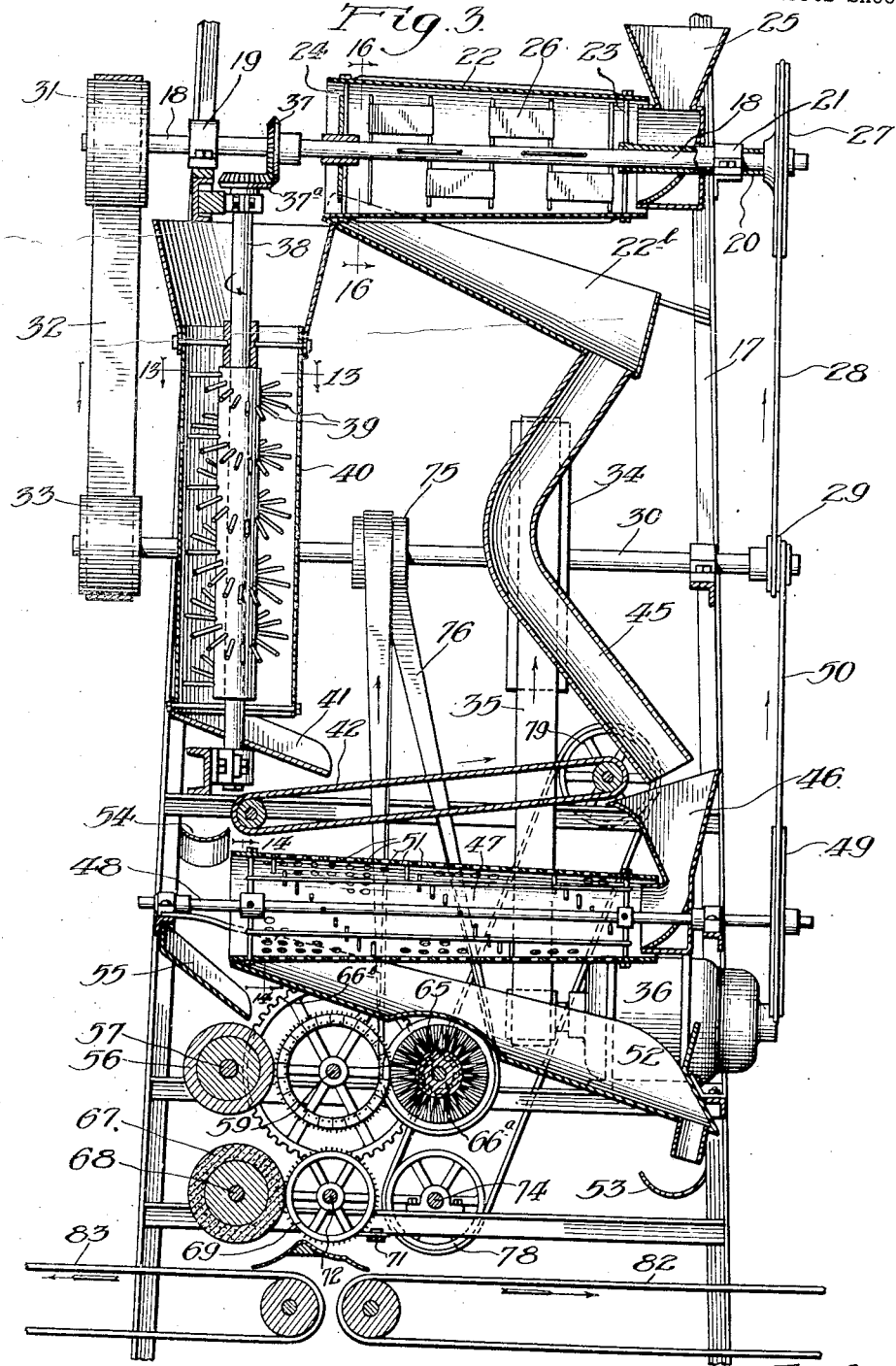

Oct. 20, 1931.  F. A. COARI  1,827,736
NUT PICKING MACHINE
Filed April 14, 1928  5 Sheets-Sheet 4
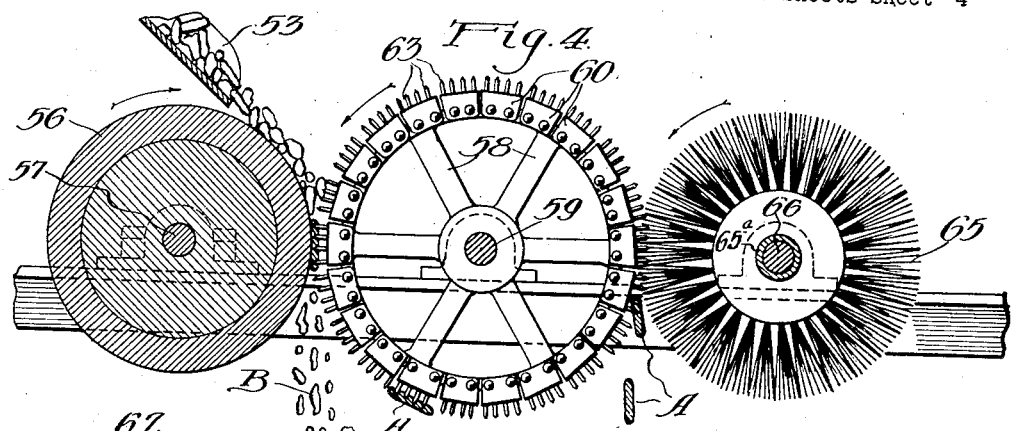
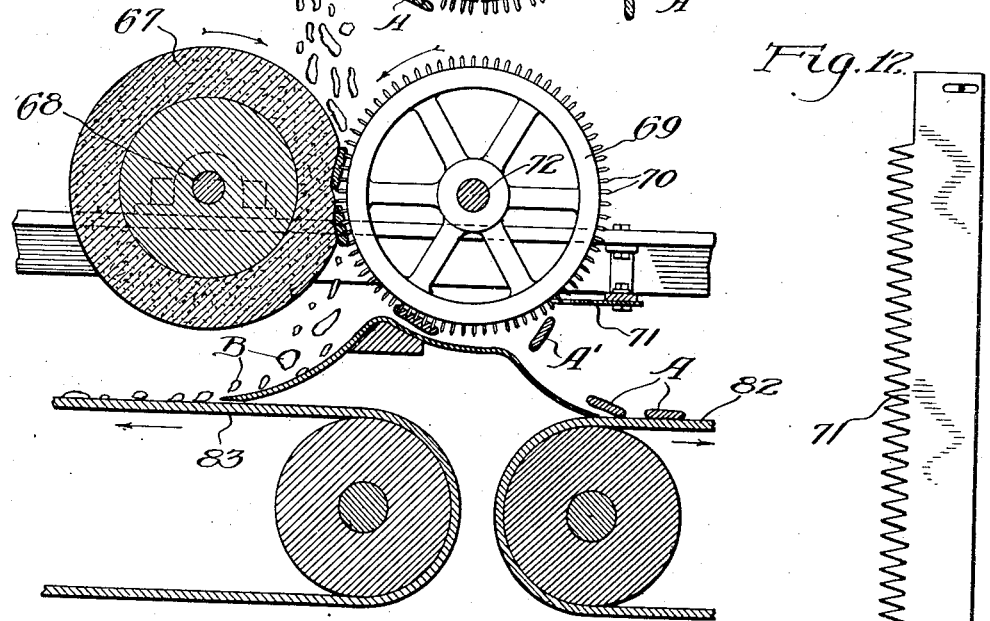
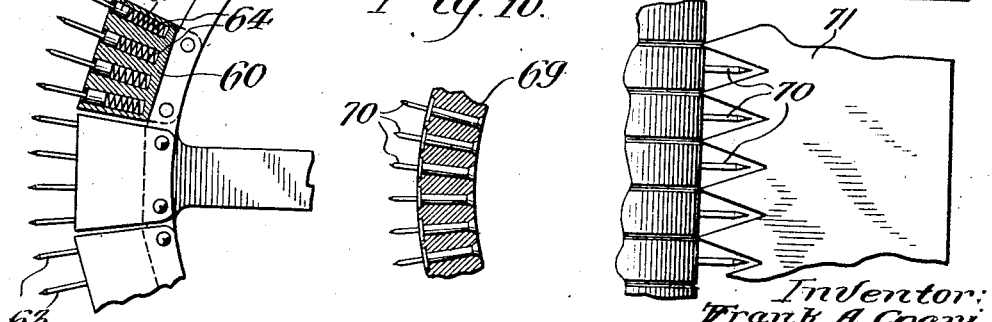
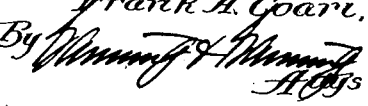

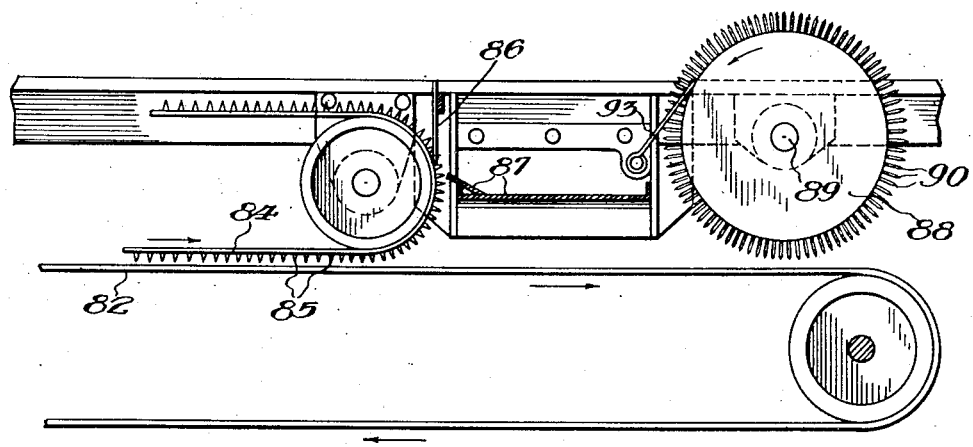
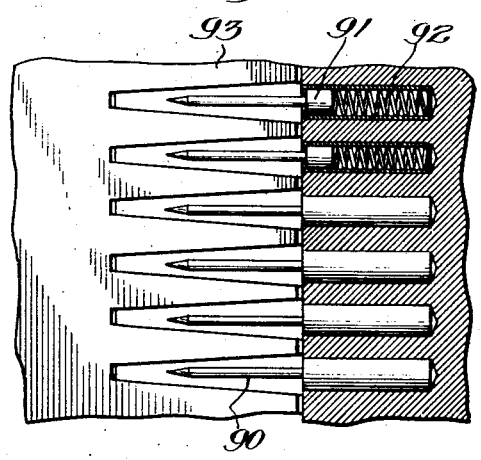
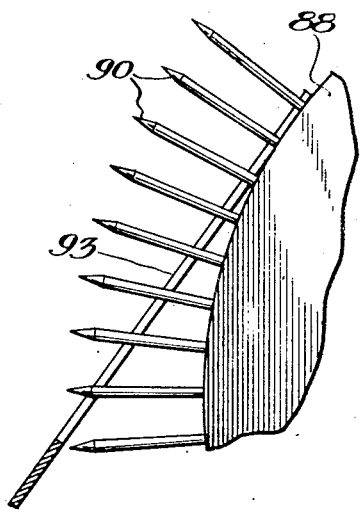
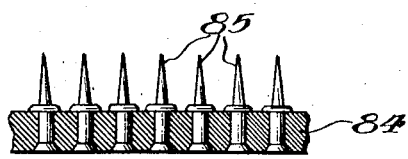

Patented Oct. 20, 1931

1,827,736

UNITED STATES PATENT OFFICE

FRANK A. COARI, OF CHICAGO, ILLINOIS

NUT PICKING MACHINE

Application filed April 14, 1928. Serial No. 269,899.

This invention relates to nut picking machines for use on cracked pecans and the like.

An object of this invention is to provide an improved type of nut picking machine which will separate the kernels from the shells and unpicked nuts.

Another object is to provide a machine which will separate from the bulk of nuts fed thereto any uncracked nuts or nuts which are substantially whole, so that these nuts are prevented from passing through the machine.

These and other objects, as will hereinafter appear, are accomplished by this invention which is fully described in the following specification and shown in the accompanying drawings in which—

Figure 1 is a front elevation of a machine embodying the invention;

Fig. 2 is an end elevation of the same;

Fig. 3 is a partial enlarged vertical section through the machine;

Fig. 4 is a partial enlarged section of the picker rolls shown in the bottom part of Fig. 3;

Fig. 5 is an enlarged view of the last picker belt mechanism;

Figs. 6 and 7 are enlarged detailed views of the picker roll shown in Fig. 5;

Fig. 8 is an enlarged transverse section of the picker pins of the picker belt shown in Fig. 5;

Fig. 9 is a partial enlarged detail of the picker roll shown in the upper portion of Fig. 4;

Figs. 10 and 11 are details of the picker roll shown in the center of Fig. 4;

Fig. 12 is a detail of the comb for cleaning the pins of Fig. 11;

Fig. 13 is an enlarged horizontal section through the rattler housing taken on line 13—13 of Fig. 3;

Fig. 14 is an enlarged vertical section taken on the line 14—14 of Fig. 3;

Fig. 15 is a partial vertical section through the upper portion of the rattler housing;

Fig. 16 is an enlarged vertical section taken on line 16—16 of Fig. 3; and

Fig. 17 is a detail showing the drive for the rotary brush.

The embodiment illustrated comprises a nut picking machine which is carried upon a suitable framework 17 preferably made up of structural shapes riveted together. A shaft 18 is journaled in a bearing 19 at one end, while the opposite end of the shaft is journaled in a sleeve 20, this sleeve being journaled in a bearing 21.

A drum is made up of two semi-cylindrical sheet metal sections 22 which are secured at one end by means of a spider 23 to the sleeve 20, while the opposite ends of the drum are carried by a spider 24 which is journaled on the shaft 18. A hopper 25 is carried by the frame 17 and delivers to the end of the drum 22. The shaft 18 carries a series of paddles 26 or other means for agitating the cracked nuts which are fed to the drum 22 through the hopper 25.

The sleeve 20 carries a pulley 27 which is driven by means of a belt 28 from a sheave 29 on the shaft 30, this shaft being suitably journaled in the main frame. The shaft 18 carries a pulley 31 which is driven by means of a belt 32 from the pulley 33 on the shaft 30. The shaft 30 is driven through a pulley 34 and a belt 35 from an electric motor 36.

The semi-cylindrical drum portion 22 overlaps, the ends 22ª being carried out tangentially to form lips which overlap the adjacent circular edge of the other shell. The direction of motion of the drums 22 is such that the lips 22ª are following, as shown in Fig. 16, so that particles of kernels and shells will be able to work through the longitudinal slots thus formed, and will fall upon a chute 22ᵇ which is suitably supported beneath the drums. The paddles 26 are rotating in the same direction as the drums 22, but at a much faster rate. Thus it will be seen that most of the particles of nut kernels and shells will pass out through these longitudinal slots 22ᶜ, the larger particles, however, passing from right to left, as shown in Fig. 3, and falling into a rattler housing 40, as will be later described.

The shaft 18 carries a bevel pinion 37 which meshes with a bevel gear 37ª on a substantially vertical shaft 38 which is suitably journaled on the main frame. This shaft carries a series of radial pins 39 which are arranged in the form of a spiral. The rattler or agitator housing 40 surrounds these pins and is cylindrical in form, the cylinder being only slighter larger than the outer diameter of the spiral or agitator formed by the pins.

Thus it will be seen that any large particles of kernels and shells dropping from the ends of the drum 22 into the rattler housing 40 will pass through between the pins 39 or between the ends of the pins and the housing wall and out through a chute 41 to a conveyor belt 42. The whole or substantially uncracked nuts falling upon the spirally arranged pins 39, which are driven at quite a high speed, will not be able to pass through between the pins, but will be rattled violently around the housing 40 and will be carried up toward the top of the housing and the uncracked nuts will eventually pass out through an opening 43, as shown in Fig. 15, and thence down through a pipe 44 which will carry them either to a receptacle or to a machine for cracking them. The nuts which are cracked but which remained intact upon entering the rattler housing are broken up by the revolving spiral and the kernels and shell particles thereof fall through the housing onto belt 42.

The chute 22$^b$ leads through a pipe 45 to a hopper 46 which feeds the pieces of nut kernels and shells to a revolving drum 47 which is carried upon a shaft 48 journaled within suitable bearings carried by the main frame 17, and driven by means of a pulley 49 and belt 50 from the shaft 30. The kernels and shell particles are directed through pipe 45, which serves as a by-pass to hopper 46, as a means for preventing the kernels from being bruised or broken by the revolving spiral in housing 40. It can thus be seen that the kernels are delivered to the picker mechanism in perfect condition. The drum 47 is provided with a series of perforations 51 which enables the smaller pieces of nut kernels and shells to pass through the drum and onto a chute 52, from which they pass by gravity to a chute 53 which carries the dust and very small particles of nut kernels and shells to a suitable receptacle (not shown) at one side.

The small belt conveyor 42 is placed on an incline, so that any small whole or substantially uncracked nuts which might pass through the rattler housing 40 will roll down the conveyor and out through a chute 54 to the same receptacle which receives the nuts from the tube or chute 44.

The nut kernels and shells, as yet unseparated, pass out through the large end of the drum 47 and are carried by a chute 55 to the first picker rolls which are shown in detail in Fig. 4. A roll 56 is carried upon a shaft 57, while the picker roll 58 is carried on a shaft 59. The picker roll 58 is provided with a series of members 60, as shown in Fig. 9, which are provided with openings 61 in which are located plungers 62 carrying sharp pins 63, the plungers being normally pressed outwardly by means of springs 64. The openings 61 are provided with stops or closures at the outer end so that the plunger 62 will not pass outwardly beyond the point shown in Fig. 9.

The rolls 56 and 58 are driven in opposite directions, as will later be explained, at substantially the same surface speeds. Thus it will be seen that as the relatively soft nut kernels pass between the sharp pins 63 and the relatively unyielding roll 56, the kernels will be impaled upon the pins 63. By means of a revolving brush 65 carried upon a sleeve 66$^a$ journaled on the shaft 66 and driven by a sprocket chain 66$^b$ from the shaft 59, these kernels A, as will later be described, are carried away by means of a conveyor where a second picking or separating operation takes place.

On the other hand, the hard particles of shells B will not be pierced by the pins 63 and consequently will fall, as shown in Fig. 4, upon a roll 67 which is carried upon a shaft 68. A roll 69 placed opposite the roll 67 is provided with a series of rows of sharp pins 70 which are rigidly secured thereto, as shown in Fig. 10. In this case, the roll 67 is made of a yielding material, such as sponge rubber, which permits the particles of shells to pass through between the roll 67 and roll 69 without being perforated or impaled; whereas any pieces of nut kernels which were not picked up by the roll 60 are impaled upon the pins 70 and are carried around and scraped off the pins 70 by means of a comb 71 which is shown in detail in Fig. 11. The roll 69 is mounted upon a shaft 72.

Referring now to Fig. 1, it will be seen that the shafts of Fig. 4, namely, shafts 57, 59, 68, 72, and 74 are driven by a sprocket chain 73 which passes over and under sprockets on these shafts, and also around a sprocket journaled on the shaft 66. The shaft 66 is driven by means of a pulley 75 keyed thereon through a belt 76 and pulley 77 on the shaft 30. A pinion 66$^a$ on the shaft 66 drives a gear 66$^b$ on the shaft 59. A pulley 78 on the shaft 74 drives a pulley 79 on a shaft 80 by means of a belt 81. The shaft 80, in turn, drives the small belt conveyor 42.

Referring now to Fig. 4, it will be noted that the nut kernels are thus separated from the shells by the two picking operations just described, the nut kernels A passing to the right and falling upon a belt conveyor 82, while the shells B fall upon a similar conveyor 83. These are driven in opposite directions, as indicated by the arrows, by any suitable means, not shown. The shells fall into any suitable receptacle while the kernels A are subjected to another picking operation Referring now to Figs. 1 and 5, the kernels carried along by the belt conveyor 82 pass under a small picker belt 84 which has a series of sharp pins 85 secured thereto, as shown in Fig. 8. These pins impale the nut kernels, the pins passing in the same direction and at substantially the same rate of speed as the upper strand of the belt conveyor 82. Thus most of the kernels on the belt conveyor 82 are picked up by the pins 85 and are carried up until they are scraped off by means of a comb 86 which causes the kernels to fall upon a chute 87 which delivers them to a suitable receptacle, not shown.

Since some of the nut kernels might not be picked up by the pins 82, another roll 88 lies just over the upper strand of the belt conveyor 82 and is mounted upon a shaft 89. This roll carries a series of yieldable pins 90 of the character similar to that previously described, as shown in Fig. 9.

The pins 90 are carried by plungers 91 and are pressed outwardly by means of springs 92. These pins are traveling in the same direction as the upper strand of the belt conveyor 82 and at substantially the same speed, and they serve to impale any nut kernels not picked up by the pins 85. The nut kernels are thus carried around, and are scraped off the pins 90 by means of a comb 93 which also serves to transfer these kernels to the chute 87. Any pieces of shells, therefore, which might have found their way to the belt conveyor 82 will not be perforated by the pins 85 or 90, but will pass around the outer end of the belt conveyor 82 to a chute 94 and thence to a suitable receptacle, not shown.

While I have shown and described but a single embodiment of my invention, it is to be understood that it is capable of many modifications. Changes, therefore, in the construction and arrangement may be made which do not depart from the spirit and scope of the invention as covered by the appended claims.

I claim:

1. In a nut picker mechanism, means for separating particles of nut kernels and shells of cracked nuts from whole and substantially whole cracked nuts, a feeder drum for receiving said nut kernels and shells of cracked nuts, means for separating kernels from the shell particles, and a housing having agitating means therein between the said separating means and said feeder drum for breaking up substantially whole cracked nuts and separating out uncracked and substantially whole nuts from the bulk thereof.

2. In a nut picker mechanism, a rotatable drum having rotatable means therein for separating nut kernels and shells of cracked nuts from whole and substantially uncracked nuts, means for separating said kernels from the shell particles, a housing having agitating means therein for separating out whole and substantially whole nuts from and breaking up the bulk of cracked nuts, and conveyor means for carrying kernels and shell particles of said cracked nuts to said separating means.

3. In a nut picking machine, a rotatable unit for carrying cracked nuts and separating kernels and shell particles from whole and substantially uncracked nuts; a feeder drum; means for conveying said kernels and shell particles directly to said feeder drum; a housing for receiving the whole and substantially uncracked nuts, agitating means in said housing for breaking up the uncracked nuts and loosening the kernels from the shells; said agitating means separating and discharging from the housing any substantially whole nuts; conveyor means for carrying said loosened kernels and shells to said feeder drum and to effect separation of any remaining whole nuts from the kernels and shells; said feeder drum being perforated to permit discharge of very fine particles away from said kernels and shells, and means for separating the kernels and shells.

4. In a nut picking machine, a drum having rotatable means therein for separating particles of the kernels and shells of cracked nuts from cracked substantially whole or uncracked nuts, a housing arranged to receive said intact nuts, agitating means in said housing to break up the cracked intact nuts and shake kernels from the shell particles, said means discharging the whole uncracked nuts from said housing, a feeder drum adapted to receive the kernels and shell particles from said first mentioned drum and said agitating means, and means for separating the kernels from the shell particles.

5. In a nut picking machine, rotatable conveyor means having rotatable means therein for separating kernels and shell particles from the bulk of cracked nuts, a cylindrical housing for receiving substantially whole and intact cracked nuts discharged from said conveyor, rotatable agitating means in said housing for breaking up said intact cracked nuts to release the kernels therefrom, said means carrying any uncracked nuts from said housing, a feeder drum arranged to receive the kernels and shell particles from said rotatable conveyor and said housing, picker mechanisms for separating the kernels from the shells, and conveyor means for separately conveying the kernels and shells.

6. In a nut picking machine, a rotatable drum having rotatable means therein for conveying cracked nuts and for separating kernels and shell particles from the bulk thereof, a rattler unit including a housing through which said bulk passes, means in said housing to break up the intact cracked nuts in said bulk to loosen the kernels from the shells, said means discharging the uncracked nuts from said housing, a feeder drum arranged to receive kernels and shells from said rotatable drum and said rattler unit, said feeder drum discharging said kernels and shells into the path of picker means for separating the kernels from the shells, and conveyor means for separately carrying away said seperated kernels and shells.

7. In a nut picking machine, a unit for carrying cracked nuts and for separating kernels and shell particles from the bulk thereof, a feeder drum, means for conveying said kernels and shell particles direct to said feeder drum, a rattler unit for receiving said bulk of cracked nuts, said rattler unit comprising a housing having rotatable means therein for breaking up said cracked nuts and loosening the kernels from the shells, conveyor means for carrying said shells and kernels to said feeder drum and to permit the separation of any remaining uncracked nuts from said shells and kernels, said drum being constructed for the passage of very fine particles away from said shells and kernels, and means for receiving this bulk of cracked shells and kernels and for separating the kernels from the shells.

In witness whereof, I have hereunto set my hand and affixed my seal this 6th day of April, 1928.

FRANK A. COARI.